Feb. 18, 1958  K. OECHSLIN  2,823,890
HOUSING FOR GAS OR STEAM TURBINES
Filed Sept. 17, 1953
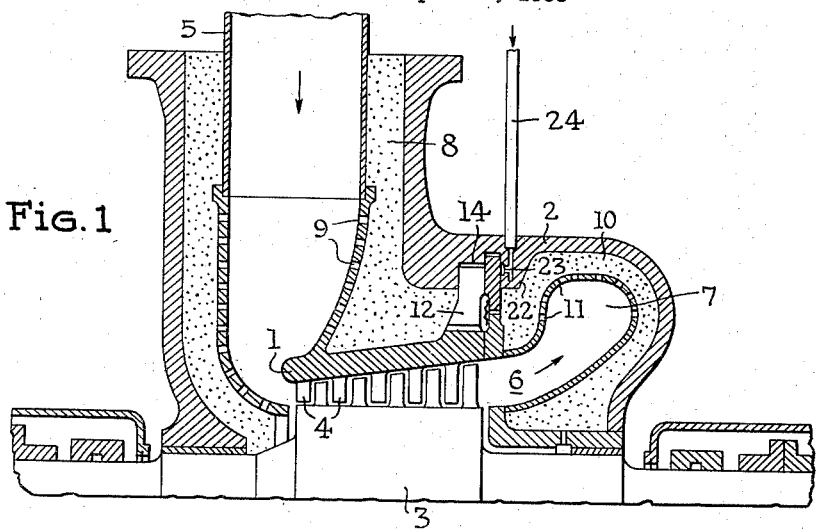
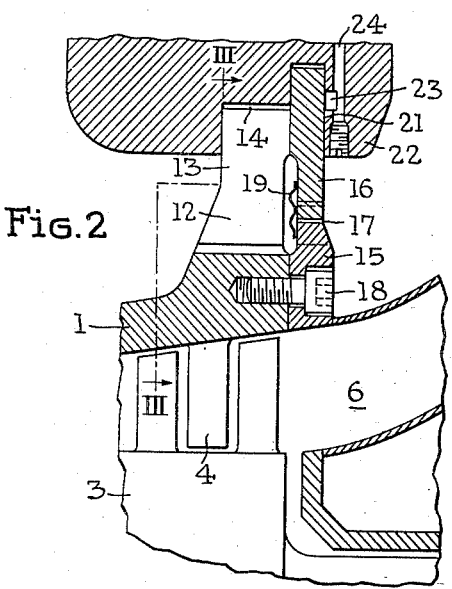
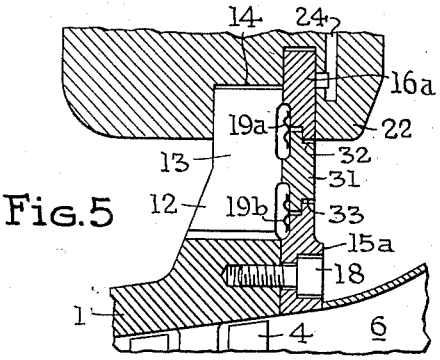
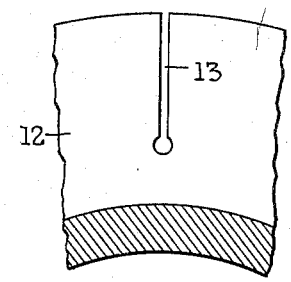
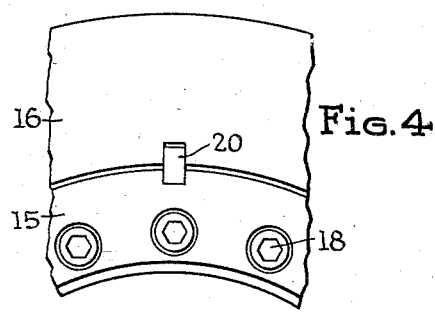
INVENTOR
Konrad Oechslin
BY
ATTORNEYS

United States Patent Office 2,823,890
Patented Feb. 18, 1958

2,823,890

HOUSING FOR GAS OR STEAM TURBINES

Konrad Oechslin, Zurich, Switzerland, assignor to Aktiengesellschaft fuer Technische Studien, Zurich, Switzerland, a corporation of Switzerland Application September 17, 1953, Serial No. 380,669

Claims priority, application Switzerland September 27, 1952

4 Claims. (Cl. 253—39)

The invention relates to a housing for gas or steam turbines which comprises an external housing and an internal housing.

Housings of this nature are employed more particularly when the driving medium under pressure is at high temperature. The internal housing then serves to guide the stream of driving medium and as a carrier for the guide assemblies of the turbine and is insulated from the outer housing. The pressure of the driving medium is taken up by the external housing, which is at lower temperature than the internal housing by reason of the layer of insulation disposed in the intermediate space, so that the material is capable of withstanding relatively high stress. Both the external housing and the internal housing generally are separable into two parts on a plane passing through the longitudinal axis of the turbine.

In the known constructions of this type, the external housing is still further insulated from the ambient atmosphere, and such constructions do not permit keeping the external housing relatively cold, that is to say, at only a slightly higher temperature than the ambient atmosphere, since considerable temperature drops would then be set up in that part of the internal housing by which the latter bears against the external housing. This would result in high thermal stresses. Moreover, it must be borne in mind that this part must at the same time form a tight seal for the intermediate space between the internal housing and the external housing in order to prevent driving medium from by-passing the blading and thus passing from the inlet side to the outlet side of the turbine.

The object of the invention is to provide a turbine housing of the aforesaid type, in which the external housing can be kept relatively cold and in which nevertheless no high thermal stresses arise and the space between the internal housing and the external housing is well sealed off in the axial direction. The external housing then need not be insulated from the ambient atmosphere.

In accordance with the invention, this object is achieved by reason of the fact that the internal housing is supported in the external housing by means of a radially slotted flange, and that the space between the external housing and the internal housing is sealed against flow in the axial direction by at least two coaxially arranged one-part rings which have in the radial direction a clearance bridged by a one-part sealing plate.

The one-part sealing plate is preferably a thin corrugated plate. Furthermore, it is advantageous for the one-part rings to be centred by at least three keys permitting radial displacement.

The innermost ring is preferably rigidly connected to the internal housing, and it may be secured to the low-pressure end of the internal housing.

The outermost ring may be secured to the external housing. In a convenient construction of the subject of the invention, the outermost ring engages in a slot in the external housing in such manner that it can expand radially. The said ring may bear at least partly against the slotted supporting flange of the internal housing and may be engaged together therewith in the slot in the external housing.

In order to prevent quantities of leaking driving medium from flowing between the outermost ring and the external housing, with the consequent danger of the layer of insulation becoming heated, it is expedient to introduce into an annular slot in the external housing, in the region of the surface of contact where the outermost ring bears against a part of the external housing, a relatively cold blocking medium which is at a pressure higher than the pressure obtaining in the housing on the high-pressure side.

Two constructional forms of the subject of the invention are illustrated by way of example in the accompanying drawings, in which:

Figure 1 is an axial section through the upper half of a turbine housing consisting of an internal housing and an external housing.

Figure 2 is an illustration on a larger scale of that part of Figure 1, in which the internal housing bears on the external housing.

Figure 3 is a fragmentary view of the supporting flange of the internal housing as seen in the axial direction towards the outlet side of the housing, with a section through the internal housing on the line III—III of Figure 2.

Figure 4 is a fragmentary view of the rings serving for the sealing, as seen in the axial direction towards the inlet side of the turbine.

Figure 5 is a view similar to Figure 2, showing a modification.

The turbine housing comprises an internal housing 1 and an external housing 2. Mounted in the housing is a rotor 3. The internal housing supports guide blades 4. The flowing medium enters through a tube 5 connected to the internal housing, expands in the blading of the turbine and leaves it through a diffusor 6 and an adjoining discharge chamber 7.

The internal housing 1 defines with the external housing 2 an intermediate space 8 containing insulating material. The intermediate space 8 communicates through apertures 9 with the inlet chamber of the internal housing 1, so that the same pressure obtains in the intermediate space as in the inlet tube 5.

On the outlet side of the turbine, on the other hand, the external housing surrounds a space 10 containing insulating material, which communicates with the discharge chamber 7 through apertures 11.

The internal housing 1 comprises a flange 12 having radial slots 13 at various points along its periphery. The flange engages in a slot 14 in the external housing 2.

15 and 16 are two coaxially arranged one-part rings having between them a radial clearance 17.

The inner ring 15 is rigidly connected to the low-pressure end of the internal housing by screws 18. The outer ring 16, on the other hand, engages together with the supporting flange 12 in the slot 14 of the external housing 2.

19 is a one-part sealing plate, which is connected to the two rings 15 and 16 and bridges the clearance 17.

In the illustrated housing, the internal housing 1 is thus supported in the external housing 2 by the radially slotted flange 12, and the intermediate space 8 between the internal housing and the external housing is sealed off by the two coaxially arranged one-part rings 15 and 16, which have in relation to one another in the radial direction the clearance 17 bridged by the one-part sealing plate 19.

The sealing plate 19 is a thin corrugated plate.

Owing to the radial slotting, no annular stresses are set up in the supporting flange. The flange is substantially unaffected by a radial temperature drop, and thermal stresses are avoided. The flange portions situated between the slots can expand freely in the radial direction. However, a good sealing of the space between the internal housing and the external housing is nevertheless effected with the aid of the rings 15 and 16.

Some thermal stresses are set up in these rings, but owing to the subdivision into two rings these thermal stresses are kept within permissible limits, since each ring can expand independently.

In the construction according to the invention, more than two coaxially arranged rings having in relation to one another a radial clearance bridged by a sealing plate may be employed for the sealing. In order to take up the axial pressure, the ring must then have radially overlapping offset portions, so that radial expansion is not prevented. In this way, the thermal stresses are still further reduced. Such a scheme is indicated in Figure 5 and will be described hereinafter in detail.

The two rings 15 and 16 may be centred in relation to one another by three keys 20, one of which is shown in Figure 4.

The outer ring 16 bears in a region 21 against a part 22 of the external housing 2. In the bearing region, the part 22 has an annular slot 23, and means are provided for introducing a relatively cold blocking medium into said slot. The said blocking medium is introduced through a duct 24 and is at a pressure higher than the pressure obtaining in the intermediate space 8 on the high-pressure side in the housing. Even the smallest quantities of leaking hot flowing medium are thus prevented from passing through the intermediate space and flowing around the ring 16 in the bearing region 21 and thus reaching the outlet side of the housing.

Referring now to Figure 5, and using to identify unchanged parts the same numerals as are used in Figures 1–4, rings 15a and 16a replace the rings 15 and 16. They are dimensioned to permit interposition between them of a third ring 31. This has stepped outer and inner peripheries 32 and 33. The outer periphery of 15a and the inner periphery of 16a are similarly stepped. They afford radial clearance. Two corrugated sealing plates 19a and 19b are used, and each functions as does the part 19 of Figures 1 and 2.

What is claimed is:

1. A housing structure for high temperature elastic fluid turbines, comprising an external housing and a smaller internal housing arranged within said external housing coaxially therewith, whereby an intermediate space is afforded; insulating material filling the space between the two housings; a radially slotted flange rigidly connected at its inner margin to said internal housing, extending across said intermediate space in a plane normal to the turbine axis and engaging in a circumferential groove formed in the external housing; a plurality of one-piece rings in encircling relation with one another, arranged coaxially with said flange and in juxtaposition thereto, there being an annular inter-ring clearance between successive rings, the innermost of said rings being sealed to the internal housing and the outermost of said rings engaging in a circumferential recess of the outer housing; and sealing means for each inter-ring clearance comprising a one-piece flexible annular sealing sheet bridging the corresponding clearance and being fixed in fluid tight relation to each of two juxtaposed rings.

2. The combination defined in claim 1 in which the one-piece annular sealing sheet is formed with at least one annular corrugation.

3. A housing structure for high temperature elastic fluid turbines, comprising an external housing and a smaller internal housing arranged within said external housing coaxially therewith, and affording an intermediate space; insulating material in the space between the two housings; a radially slotted flange rigidly connected to said internal housing, extending across said intermediate space in a plane normal to the turbine axis and engaging in a circumferential groove formed in the external housing; two one-piece rings arranged coaxially to said flange and in juxtaposition thereto one ring encircling the other and spaced therefrom to afford an annular clearance between the two rings, the inner of said rings being sealed to the internal housing and the outer of said rings engaging in said circumferential groove of the external housing in juxtaposition to said flange and bearing on one side in the direction of the turbine axis against the external housing; and a one-piece flexible annular sealing sheet bridging said annular clearance between said two rings and sealed to both of the said rings.

4. A housing structure for high temperature fluid axial flow turbines, comprising an external housing and a smaller internal housing having a substantially tubular portion through which the fluid passes, arranged within said external housing coaxially therewith and affording an intermediate space; insulating material in said intermediate space; a radially slotted flange attached to the exit end of said substantially tubular portion of the internal housing and engaging in a circumferential groove formed in the external housing; two one-piece rings arranged coaxially with said flange and in lateral juxtaposition thereto, an annular clearance being afforded between the two rings, the inner of said rings being sealed to said exit end of the substantially tubular portion of the internal housing and the outer of said rings engaging in said circumferential groove of the external housing in juxtaposition to said flange and bearing on one of its faces against the external housing; and a one-piece corrugated annular sealing sheet bridging the said annular clearance between said two rings and sealed to both of the said rings.

References Cited in the file of this patent

UNITED STATES PATENTS

| | | |
|---|---|---|
| 1,058,936 | Bancel | Apr. 15, 1913 |
| 1,362,401 | Doran | Dec. 14, 1920 |
| 2,367,134 | Mierley | Jan. 9, 1945 |

FOREIGN PATENTS

| | | |
|---|---|---|
| 373,940 | Great Britain | June 2, 1932 |
| 510,505 | Great Britain | Aug. 2, 1939 |
| 661,822 | Great Britain | Nov. 28, 1951 |
| 674,280 | Great Britain | June 18, 1952 |